United States Patent
Eswaran et al.

(10) Patent No.: US 8,664,336 B2
(45) Date of Patent: *Mar. 4, 2014

(54) PROCESS FOR FORMING POLYMER BLENDS

(71) Applicant: ExxonMobile Chemical Patents Inc., Baytown, TX (US)

(72) Inventors: Vetkav R. Eswaran, Houston, TX (US); Bruce A. Harrington, Houston, TX (US); Robert F. Bahm, Pass Christian, MI (US); Smita Kacker, Annandale, NJ (US); Paul E. Rollin, Jr., Porter, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/657,085

(22) Filed: Oct. 22, 2012

(65) Prior Publication Data

US 2013/0059979 A1    Mar. 7, 2013

Related U.S. Application Data

(63) Continuation-in-part of application No. 13/132,675, filed as application No. PCT/US2009/067533 on Dec. 10, 2009, now Pat. No. 8,293,842.

(60) Provisional application No. 61/141,164, filed on Dec. 29, 2008.

(51) Int. Cl.
*C08F 8/00* (2006.01)
*C08L 23/00* (2006.01)
*C08J 3/00* (2006.01)

(52) U.S. Cl.
USPC ............ 525/191; 525/197; 525/198; 525/240

(58) Field of Classification Search
USPC ................... 525/191, 240, 197, 198
See application file for complete search history.

(56) References Cited

U.S. PATENT DOCUMENTS

| 4,087,486 | A | 5/1978 | Fielding et al. |
| 6,218,010 | B1 | 4/2001 | Georgellis et al. |
| 6,342,565 | B1 | 1/2002 | Cheng et al. |
| 6,635,715 | B1 | 10/2003 | Datta et al. |
| 6,646,056 | B2 * | 11/2003 | Zhao et al. ............ 525/243 |
| 7,863,206 | B2 * | 1/2011 | Harrington et al. ........ 442/329 |
| 7,872,075 | B2 * | 1/2011 | Ellul et al. .............. 525/192 |
| 8,192,813 | B2 * | 6/2012 | Runyan et al. .......... 428/35.7 |
| 2005/0107529 | A1 | 5/2005 | Datta et al. |
| 2006/0293458 | A1 | 12/2006 | Chung et al. |
| 2008/0015313 | A1 | 1/2008 | Chung |

FOREIGN PATENT DOCUMENTS

| JP | 55 000742 | 1/1980 |
| JP | 2001 187405 | 7/2001 |
| JP | 2001 316484 | 11/2001 |
| WO | WO 2009/064583 | 5/2009 |

* cited by examiner

*Primary Examiner* — Nathan M Nutter

(57) ABSTRACT

A method for forming a fiber, the method comprising charging to a reactive extruder a first polymer and a second polymer to form an initial blend, where the first polymer is a propylene-based elastomer including up to 35% by weight ethylene-derived units and a heat of fusion, as determined according to DSC procedures according to ASTM E-793, of less than 80 J/g and a melt temperature of less than 110° C., where the second polymer is a propylene-based polymer having a melt temperature in excess of 110° C. and a heat of fusion in excess of 80 J/g, and introducing the reactive blend to a spinneret to form a fiber or extruding the reacted blend through a plurality of die capillaries to form molten threads or filaments which are attenuated in a gas stream to form melt-blown fibers.

19 Claims, 1 Drawing Sheet

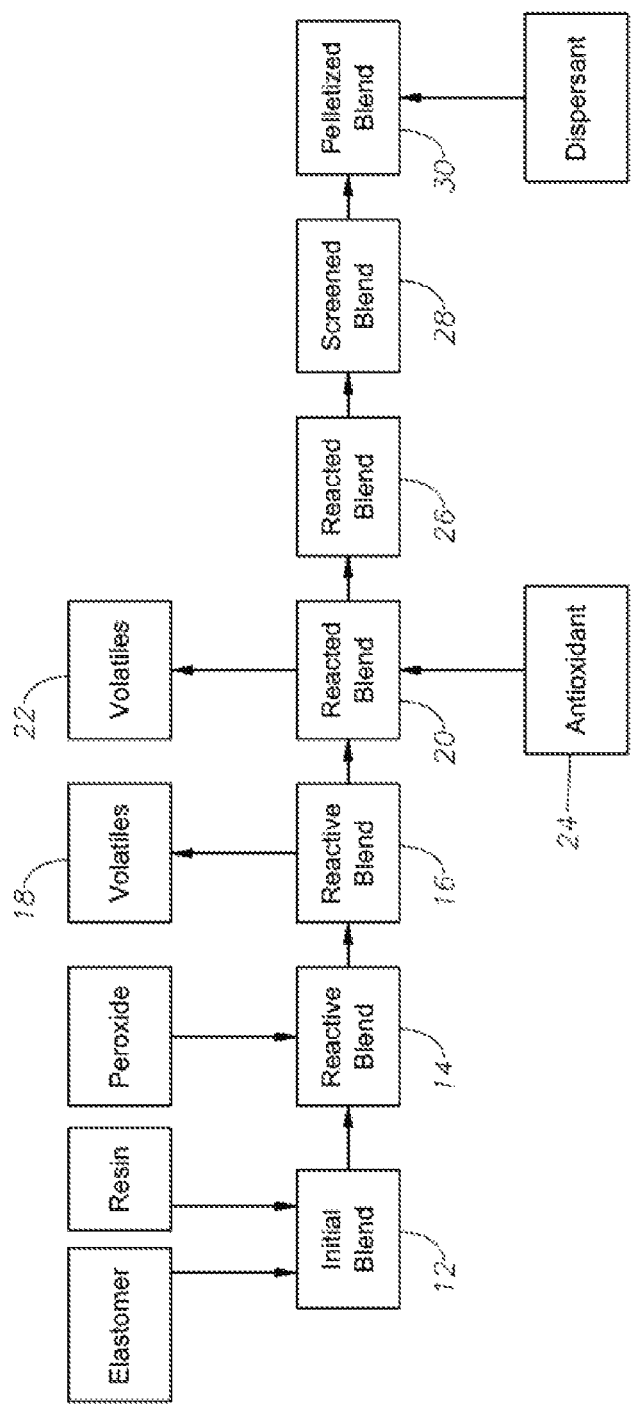

US 8,664,336 B2

PROCESS FOR FORMING POLYMER BLENDS

CROSS REFERENCE TO RELATED APPLICATION

This application is a continuation-in-part to U.S. application Ser. No. 13/132,675, filed Aug. 29, 2011, and now U.S. Pat. No. 8,293,842, which is a 371 National Stage Application of International Application No. PCT/US2009/067533, filed Dec. 10, 2009, which claims priority to U.S. Provisional Patent Application No. 61/141,164, filed Dec. 29, 2008, the disclosures of which are incorporated herein by reference in their entirety.

FIELD OF THE INVENTION

Embodiments of the present invention are directed toward methods for forming blends of propylene-based elastomer and propylene-based thermoplastic resin.

BACKGROUND OF THE INVENTION

Propylene-based elastomers, which may have been referred to as semi-amorphous propylene copolymers or crystallizable propylene-based copolymers, have been employed in the manufacture of fibers and non-woven fabrics. These copolymers are often blended with other polymers in the pursuit of sundry desirable properties.

For example, U.S. Publication No. 2005/0107529 teaches fibers prepared from propylene-based elastomers. Examples 1-4 teach the production of fibers from a melt that contains a 20 MFR propylene-ethylene copolymer containing 15 weight percent ethylene together with a propylene homopolymer. The propylene homopolymer is either a 36 MFR homopolymer or a 400 MFR homopolymer. The fibers are formed by employing a conventional fiber spinning line under partially oriented yarn mode. The fibers and non-wovens prepared therefrom can be heat set to provide durable fabrics.

U.S. Pat. No. 6,218,010 teaches an ethylene-propylene copolymer alloy that is suited for making fibers and non-woven spunbond fabrics having softness at economically acceptable processing conditions. The alloy comprises a random copolymer having an ethylene content of from about 1 to about 5% by weight in an amount of from about 40 to about 90% by weight of the alloy; and a second ethylene-propylene copolymer having an ethylene content of from about 5 to about 40% by weight, in an amount of from about 10 to about 60% by weight of the alloy. The copolymer alloys are described as prepared by a multi-reactor process comprising a first stage of polymerizing a mixture of ethylene and propylene in single or plural reactors, in the presence of a catalyst system capable of randomly incorporating the ethylene monomers and/or alpha-olefin into the macromolecules to form the random copolymer, and a second stage of, in the further presence of the random copolymer containing active catalyst, polymerizing a mixture of ethylene and propylene in single stage or in plural stages to form the second ethylene-propylene copolymer.

U.S. Pat. No. 6,342,565 teaches soft elastic fiber compositions that include a crystallizable propylene copolymer and a crystalline propylene copolymer such as isotactic polypropylene. The fibers may also include a second crystallizable propylene copolymer. The first crystallizable propylene copolymer is characterized by a melting point of less than a 105° C. and a heat of fusion of less than 45 J/g. The crystalline propylene copolymer may be characterized by a melting point above 110° C. and a heat of fusion greater than 60 J/g. Where a second crystallizable propylene copolymer is employed, it may differ from the first crystallizable propylene copolymer in molecular weight and/or crystallinity content.

U.S. Pat. No. 6,635,715 describes blends of a first isotactic polypropylene homopolymer or copolymer component with a second alpha-olefin and propylene copolymer component, wherein the first isotactic polypropylene component has a melting point above about 110° C., and the second copolymer has a melting point between about 25° C. and 105° C. The blends may have from 2 to 95 wt % of the first component and from 98 to 5 wt % of the second copolymer component. In the examples, the polypropylene used is ESCORENE 4292 (ExxonMobil Chemical Co.), an isotactic polypropylene homopolymer having a nominal melt flow rate (MFR) of 2.0 g/10 min, and the second copolymer is illustrated by an Mw (weight-average molecular weight) of 248,900 to 318,900 and by a Mooney viscosity (ML (1+4) at 125° C. according to ASTM D1646)) of from 12.1 to 38.4. The blends are directed to improved mechanical properties of processing, increased tensile strength, elongation, and overall toughness.

SUMMARY OF THE INVENTION

One or more embodiments of the present invention provides a method for forming a polymer blend, the method comprising: (i) charging to a reactive extruder a first polymer and a second polymer to form an initial blend, where the first polymer is a propylene-based elastomer including up to 35% by weight ethylene-derived units and a heat of fusion, as determined according to DSC procedures according to ASTM E-793, of less than 80 J/g and a melt temperature of less than 110° C., where the second polymer is a propylene-based polymer having a melt temperature in excess of 110° C. and a heat of fusion in excess of 80 J/g; (ii) after said step of charging, charging a peroxide to the initial blend to thereby form a reactive blend; (iii) conducting the reactive blend at a flow rate through a series of barrels within the extruder; (iv) subjecting the reactive blend, in one or more barrels, to high shear mixing; (v) maintaining the temperature of the reactive blend at a temperature sufficient to decompose at least 50% of the peroxide and thereby form a reacted blend; (vi) restricting flow rate of the reacted blend through one or more barrels to increase the time that the reactive blend is subjected to the high shear mixing; (vii) removing compounds from the reacted blend or the reactive blend; (viii) introducing an antioxidant to the reacted blend; (ix) increasing flow rate of the reacted blend through one or more barrels; (x) after said step of increasing the flow rate, passing the reacted blend through one or more screens to thereby remove unwanted contaminates; and (xi) pelletizing the reacted blend.

Still other embodiments of the present invention provide a method for forming a polymer blend, the method comprising: (i) charging to a reactive extruder a first polymer and a second polymer to form a blend, where the first polymer is a propylene-based elastomer including up to 35% by weight ethylene-derived units and a heat of fusion, as determined according to DSC procedures according to ASTM E-793, of less than 80 J/g and a melt temperature of less than 110° C., where the second polymer is a propylene-based polymer having a melt temperature in excess of 110° C. and a heat of fusion in excess of 80 J/g; (ii) after said step of charging, charging a peroxide to the blend to thereby form a reactive blend; (iii) conducting the reactive blend at a flow rate through a series of barrels within the extruder; (iv) subjecting the reactive blend, in one or more barrels, to high shear mixing; (v) maintaining the temperature of the reactive blend at a temperature of at least 165° C. for at least 5 seconds and thereby form a reacted blend; (vi) restricting flow rate of the reacted blend through one or more barrels to increase the time that the reactive blend is subjected to the high shear mixing; (vii) removing compounds from the reacted blend or the reactive blend; (viii) introducing an antioxidant to the reacted blend; (ix) increasing flow rate of the reacted blend through one or more barrels; (x) after said step of increasing the flow rate, passing the reacted blend through one or more screens to thereby remove unwanted contaminates; and (xi) pelletizing the reacted blend.

Still other embodiments of the present invention provide a method for forming one or more fibers, the method comprising: (i) charging to a reactive extruder a first polymer and a second polymer to form an initial blend, where the first polymer is a propylene-based elastomer including up to 35% by weight ethylene-derived units and a heat of fusion, as determined according to DSC procedures according to ASTM E-793, of less than 80 J/g and a melt temperature of less than 110° C., where the second polymer is a propylene-based polymer having a melt temperature in excess of 110° C. and a heat of fusion in excess of 80 J/g; (ii) after said step of charging, charging a peroxide to the initial blend to thereby form a reactive blend; (iii) conducting the reactive blend at a flow rate through a series of barrels within the extruder; (iv) subjecting the reactive blend, in one or more barrels, to high shear mixing; (v) maintaining the temperature of the reactive blend at a temperature sufficient to decompose at least 50% of the peroxide and thereby form a reacted blend; (vi) restricting flow rate of the reacted blend through one or more barrels to increase the time that the reactive blend is subjected to the high shear mixing; (vii) increasing flow rate of the reacted blend through one or more barrels; (viii) after said step of increasing the flow rate, passing the reacted blend through one or more screens to thereby remove unwanted contaminates; and either (ix) extruding the reacted blend through a plurality of die capillaries to form molten threads or filaments and attenuating the molten threads or filaments in a gas stream to form meltblown fibers or (ix) introducing the reacted blend to a spinneret to form one or more filaments and (x) quenching the filaments with air to form one or more fibers.

Still other embodiments of the present invention provide a method for forming one or more fibers, the method comprising: (i) charging to a reactive extruder a first polymer and a second polymer to form a blend, where the first polymer is a propylene-based elastomer including up to 35% by weight ethylene-derived units and a heat of fusion, as determined according to DSC procedures according to ASTM E-793, of less than 80 J/g and a melt temperature of less than 110° C., where the second polymer is a propylene-based polymer having a melt temperature in excess of 110° C. and a heat of fusion in excess of 80 J/g; (ii) after said step of charging, charging a peroxide to the blend to thereby form a reactive blend; (iii) conducting the reactive blend at a flow rate through a series of barrels within the extruder; (iv) subjecting the reactive blend, in one or more barrels, to high shear mixing; (v) maintaining the temperature of the reactive blend at a temperature of at least 165° C. for at least 5 seconds and thereby form a reacted blend; (vi) restricting flow rate of the reacted blend through one or more barrels to increase the time that the reactive blend is subjected to the high shear mixing; (vi) increasing flow rate of the reacted blend through one or more barrels; (viii) after said step of increasing the flow rate, passing the reacted blend through one or more screens to thereby remove unwanted contaminates; and either (ix) extruding the reacted blend through a plurality of die capillaries to form molten threads or filaments and attenuating the molten threads or filaments in a gas stream to form meltblown fibers or (ix) introducing the reacted blend to a spinneret to form one or more filaments and quenching the filaments with air to form one or more fibers.

BRIEF DESCRIPTION OF THE DRAWINGS

FIG. 1 is a flow chart depicting a series of process steps according to embodiments of the present invention.

DETAILED DESCRIPTION OF THE INVENTION

Propylene-Based Elastomer

Embodiments of the present invention employ a propylene-based elastomer, which for purposes of this specification may simply be referred to as an elastomer. Propylene-based elastomers, which may also be referred to as a propylene-based copolymers, include units (i.e., mer units) derived from propylene, one or more comonomer units derived from ethylene or α-olefins including from 4 to about 20 carbon atoms, and optionally one or more comonomer units derived from dienes. In one or more embodiments, the α-olefin comonomer units may derive from ethylene, 1-butene, 1-hexene, 4-methyl-1-pentene and/or 1-octene. In one or more embodiments, the diene comonomer units may derive from 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. The embodiments described below are discussed with reference to ethylene as the α-olefin comonomer, but the embodiments are equally applicable to other propylene-based copolymers with other α-olefin comonomers.

In one or more embodiments, the propylene-based elastomers may include at least 7 wt %, in other embodiments at least 8 wt %, in other embodiments at least 9 wt %, and in other embodiments at least 10 wt % ethylene-derived units; in these or other embodiments, the copolymers may include up to 25 wt %, in other embodiments up to 22 wt %, in other embodiments up to 20 wt %, and in other embodiments up to 18 wt % ethylene-derived units, where the percentage by weight is based upon the total weight of the propylene-derived and α-olefin derived units. In these or other embodiments, the propylene-based elastomers may include at least 75 wt %, or in other embodiments at least 78 wt %, propylene-derived units; and in these or other embodiments, the copolymers may include up to 80 wt %, in other embodiments up to 82 wt %, in other embodiments up to 93 wt %, and in other embodiments up to 90 wt % propylene-derived units, where the percentage by weight is based upon the total weight of the propylene-derived and α-olefin derived units. The propylene-based elastomer may have diene derived mer units in an amount from about 0.5 wt % up to 5 wt % of the total polymer.

The ethylene content can be measured as follows for a copolymer having an ethylene content between 5 and 40 wt % ethylene. A thin homogeneous film is pressed according to sub-method A of ASTM D-3900. It is then mounted on a Perkin Elmer Spectrum 2000 infrared spectrophotometer. A full spectrum is recorded using the following parameters: Resolution: 4.0 cm$^{-1}$, Spectral Range: 4500 to 450 cm$^{-1}$. Ethylene content is determined by taking the ratio of the propylene band area at 1155 cm$^{-1}$ to the ethylene band area at 722-732 cm$^{-1}$ ($C_3/C_2$=AR) and applying it to the following equation: Wt % Ethylene=$73.492 - 89.298X + 15.637X^2$, where X=AR/(AR+1) and AR is the peak area ratio (1155 cm$^{-1}$/722-732 cm$^{-1}$).

The propylene-based elastomer of one or more embodiments are characterized by having a broad melting transition as determined by differential scanning calorimetry (DSC) with possible more than one maxima points. The melting point ($T_m$) discussed here refers to the highest temperature at which a maxima in heat absorption within the range of melting of the sample occurs.

In one or more embodiments, the $T_m$ of the propylene-based elastomer (as determined by DSC) is less than 120° C., in other embodiments less than 100° C., in other embodiments less than 65° C., and in other embodiments less than 60° C.

In one or more embodiments, the propylene-based elastomer may be characterized by a heat of fusion ($H_f$), as determined by DSC. In one or more embodiments, propylene-based elastomer may be characterized by a $H_f$ that is at least 0.5 J/g, in other embodiments at least 1.0 J/g, in other embodiments at least 1.5 J/g, in other embodiments at least 3.0, in other embodiments at least 4.0, in other embodiments at least 6.0, and in other embodiments at least 7.0. In these or other embodiments, propylene-based elastomer may be characterized by a $H_f$ that of less than 80 J/g, in other embodiments less than 75 J/g, in other embodiments less than 65 J/g, in other embodiments less than 55 J/g, in other embodiments less than 50 J/g, in other embodiments less than 45 J/g, and in other embodiments from about 30 to about 50 J/g. Crystallinity may be determined by dividing the heat of fusion of a sample by the heat of fusion of a 100% crystalline polymer, which is assumed to be 189 J/g for isotactic polypropylene.

As used within this specification, DSC procedures for determining $T_m$ and $H_f$ include the following. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a Differential Scanning Calorimeter (Perkin Elmer 7 Pyris One Thermal Analysis System) and cooled to about −50° C. to about −70° C. The sample is heated at 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0° C. and about 200° C. It is measured in Joules and is a measure of the $H_f$ of the polymer. The $T_m$ discussed here refers to the highest temperature at which a maxima in heat absorption within the range of melting of the sample occurs. This might also be typically the temperature of the greatest heat absorption within the range of melting of the sample.

The propylene-based elastomer can have a triad tacticity of three propylene units, as measured by $^{13}C$ NMR, of 75% or greater, 80% or greater, 82% or greater, 85% or greater, or 90% or greater. In one or more embodiments, the triad tacticity ranges include from about 50 to about 99%, in other embodiments from about 60 to about 99%, in other embodiments from about 75 to about 99%, in other embodiments from about 80 to about 99%, and in other embodiments from about 60 to about 97%. Triad tacticity is determined by the methods described in U.S. Pat. No. 7,232,871.

In one or more embodiments, the propylene-based elastomer has a narrow compositional distribution (CD). This intermolecular composition distribution of the copolymer can be determined by thermal fractionation in a solvent such as hexane or heptane, as follows. Approximately 75% by weight and more preferably 85% by weight of the polymer is isolated as one or two adjacent soluble fractions with the balance of the copolymer in immediately preceding or succeeding fractions. In order for the copolymer to have a narrow compositional distribution as discussed above, each of the isolated fractions will generally have a composition (wt % ethylene content) with a difference of no greater than 20 wt % (relative) or in other embodiments no greater than 10 wt % (relative) from the average wt % ethylene content of the entire second polymer component.

In general, the propylene-based elastomers can be synthesized to have a broad range of molecular weights and/or be characterized by a broad range of MFR. For example, the propylene-based elastomers can have a MFR, as measured according to the ASTM D-1238, 2.16 kg weight @230° C., of at least 1.0 dg/min, in other embodiments at least 0.5 dg/min, and in other embodiments at least 1.5 dg/min. In these or other embodiments, the MFR may be less than 180 dg/min, and in other embodiments less than 150 dg/min.

In one or more embodiments, the propylene-based elastomer can have a weight average molecular weight ($M_w$) of about 5 to about 5,000 kg/mole, in other embodiments a $M_w$ of about 10 to about 1,000 kg/mole, in other embodiments a $M_w$ of about 20 to about 500 kg/mole and in other embodiments a $M_w$ of about 50 to about 400 kg/mole.

In one or more embodiments, the propylene-based elastomer can have a number average molecular weight ($M_n$) of about 2.5 to about 2,500 kg/mole, in other embodiments a $M_n$ of about 5 to about 500 kg/mole, in other embodiments a $M_n$ of about 10 to about 250 kg/mole, and in other embodiments a $M_n$ of about 25 to about 200 kg/mole.

In one or more embodiments, the molecular weight distribution index (MWD=($M_w/M_n$)) of the propylene-based elastomer may be about 1 to about 40, in other embodiments about 1 to about 5, in other embodiments about 1.8 to about 5, and in other embodiments about 1.8 to about 3.

Techniques for determining the molecular weight ($M_n$, $M_w$) and molecular weight distribution (MWD) may be found in U.S. Pat. No. 4,540,753 (Cozewith, Ju and Ver Strate) (which is incorporated by the reference herein for purposes of U.S. practices) and the references cited therein and in Macromolecules, 1988, Volume 21, pp. 3360-3371 (Ver Strate et al.), which is herein incorporated by reference for purposes of U.S. practices, and references cited therein. For example, molecular weight may be determined by size exclusion chromatography (SEC) by using a Waters 150 gel permeation chromatograph equipped with the differential refractive index detector and calibrated using polystyrene standards.

The propylene-based elastomers employed in the present invention may be prepared by employing synthetic techniques known in the art for preparing propylene-based elastomers having the foregoing characteristics. Reference can be made to U.S. Pat. Nos. 6,525,157, 6,982,310, 6,992,158, 6,992,159, and 6,992,160. Propylene-based elastomers are commercially available, for example, under the trade name VISTAMAXX (ExxonMobil Chemical Co.).

Propylene-Based Thermoplastic Polymer

Embodiments of the present invention employ a propylene-based thermoplastic resin, which for purposes of this specification may simply be referred to as a resin or thermoplastic resin. Propylene-based thermoplastic resins, which may also be referred to as propylene-based thermoplastic polymers, include those polymers that primarily comprise units deriving from the polymerization of propylene. In certain embodiments, at least 98% of the units of the propylene-based thermoplastic polymer derive from the polymerization of propylene. In particular embodiments, these polymers include homopolymers of propylene.

In certain embodiments, the propylene-based thermoplastic polymers may also include units deriving from the polymerization of ethylene and/or α-olefins such as 1-butene, 1-hexene, 1-octene, 2-methyl-1-propene, 3-methyl-1-pentene, 4-methyl-1-pentene, 5-methyl-1-hexene, and mixtures thereof. Specifically included are the reactor, impact, and random copolymers of propylene with ethylene or the higher α-olefins, described above, or with $C_{10}$-$C_{20}$ diolefins.

In one or more embodiments, the propylene-based thermoplastic polymers can have a $T_m$ that is greater than 120° C., in other embodiments greater than 155° C., and in other embodiments greater than 160° C. In these or other embodiments, the propylene-based thermoplastic polymers can have a $T_m$ that is less than 180° C., in other embodiments less than 170° C., and in other embodiments less than 165° C.

In one or more embodiments, the propylene-based thermoplastic polymers may be characterized by an $H_f$ that is equal to or greater than 80 J/g, in other embodiments greater than 100 J/g, in other embodiments greater than 125 J/g, and in other embodiments greater than 140 J/g as measured by DSC.

In one or more embodiments, propylene-based thermoplastic polymers may include crystalline and semi-crystalline polymers. In one or more embodiments, these polymers may be characterized by a crystallinity of at least 40% by weight, in other embodiments at least 55% by weight, in other embodiments at least 65%, and in other embodiments at least 70% by weight as determined by DSC. Crystallinity may be determined by dividing the heat of fusion of a sample by the heat of fusion of a 100% crystalline polymer, which is assumed to be 189 J/g for isotactic polypropylene.

In general, the propylene-based thermoplastic polymers may be synthesized having a broad range of molecular weight and/or be characterized by a broad range of MFR. For example, the propylene-based thermoplastic polymers can have a MFR of at least 2 dg/min, in other embodiments at least 4 dg/min, in other embodiments at least 6 dg/min, and in other embodiments at least, where the MFR is measured according to ASTM D-1238, 2.16 kg @230° C. In these or other embodiments, the propylene-based thermoplastic polymer can have an MFR of less than 2,000 dg/min, in other embodiments less than 400 dg/min, in other embodiments less than 250 dg/min, in other embodiments less than 100 dg/min, and in other embodiments less than 50 dg/min, where the MFR is measured according to ASTM D-1238, 2.16 kg @230° C.

In one or more embodiments, the propylene-based thermoplastic polymers may be characterized by an $M_w$ of from about 50 to about 2,000 kg/mole, and in other embodiments from about 100 to about 600 kg/mole. They may also be characterized by a $M_n$ of about 25 to about 1,000 kg/mole, and in other embodiments about 50 to about 300 kg/mole, as measured by GPC with polystyrene standards.

The propylene-based thermoplastic polymers may be synthesized by using an appropriate polymerization technique known in the art such as, slurry, gas phase or solution but not limited to, using catalyst systems such as conventional Ziegler-Natta or single-site organometallic catalysts like metallocenes, or any organometallic compound capable of polymerizing olefin.

In one embodiment, the propylene-based thermoplastic polymers include highly crystalline polypropylene such as isotactic polypropylene. This polypropylene can have a density of from about 0.85 to about 0.91 g/cc, with the largely isotactic polypropylene having a density of from about 0.90 to about 0.91 g/cc.

Peroxide

Embodiments of the present invention employ a peroxide. In one or more embodiments, useful peroxides include those that can break down (i.e. size or sever) the polymeric chains and alter the molecular weight distribution. Various peroxides known in the art can be used including, but not limited to, dialkyl peroxides. Examples include 2,5-dimethyl-2,5-di-(t-butylperoxyl)hexane and dicumyl peroxide. Useful peroxides are available under the name LUPEROX 101 (Arkema).

Other Ingredients

The blends of this invention may also comprise other ingredients. For example the blends of this invention may comprise nucleating agents, which can be present at 50 to 4000 ppm based on total polymer in the blend composition. Nucleating agents include, for example, sodium benzoate and talc. Also, other nucleating agents may also be employed such as Ziegler-Natta olefin product or other highly crystalline polymer. Nucleating agents include HYPERFORM such as HPN-68 and Millad additives (e.g., Millad 3988) (Milliken Chemicals, Spartanburg, S.C.) and organophosphates like NA-11 and NA-21 (Amfine Chemicals, Allendale, N.J.).

Further, a variety of additives may be incorporated into the embodiments described above used to make the blends, fibers, and fabrics for various purposes. Other additives include, for example, stabilizers, antioxidants, fillers, and slip aids. Primary and secondary antioxidants include, for example, hindered phenols, hindered amines, and phosphites. Other additives such as dispersing agents, for example, Acrowax C, can also be included. Catalyst deactivators may also be used including, for example, calcium stearate, hydrotalcite, and calcium oxide, and/or other acid neutralizers known in the art.

In one or more embodiments, useful slip aids include those compounds or molecules that are incompatible with the polymeric matrix of the fibers (i.e., the propylene-based elastomers and/or propylene-based thermoplastic resins and/or feel modifiers) and therefore migrate to the surface of the fiber. In these or other embodiments, useful slip aids are characterized by relatively low molecular weight, which can facilitate migration to the surface. Types of slip aids include fatty acid amides as disclosed in *Handbook of Antiblocking, Release and Slip Additives*, George Wypych, Page 23. Examples of fatty acid amides include behenamide, erucamide, N-(2-hdriethyl)erucamide, lauramide, N,N'-ethylene-bis-oleamide, N,N'-ethylene bisstearmide, oleamide, oleyl palmitamide, stearyl is erucamide, tallow amide, and mixtures thereof.

Other additives include, for example, fire/flame retardants, plasticizers, vulcanizing or curative agents, vulcanizing or curative accelerators, cure retarders, processing aids, and the like. The aforementioned additives may also include fillers and/or reinforcing materials, either added independently or incorporated into an additive. Examples include carbon black, clay, talc, calcium carbonate, mica, silica, silicate, combinations thereof, and the like. Other additives which may be employed to enhance properties include antiblocking agents or lubricants.

In yet other embodiments, isoparaffins, polyalphaolefins, polybutenes, or a mixture of two or more thereof may also be added to the compositions of the invention. Polyalphaolefins may include those described in WO 2004/014998. These polyalphaolefins may be added in amounts such as about 0.5 to about 40% by weight, in other embodiments from about 1 to about 20% weight, and in other embodiments from about 2 to about 10% by weight. In particular embodiments, highly purified paraffinic oils may be used. These highly purified paraffinic oils may include greater than 70%, and in other embodiments greater than 80%, paraffin content. Useful paraffinic oils are disclosed in U.S. Publication Nos. 2006/0008643, 2006/0247332, 2006/0247331, and 2006/135699, which are incorporated herein by reference. In one or more embodiments, the paraffinic oils may advantageously be used as a carrier or a slurry medium for delivering one or more ingredients to the extruder. For example, paraffinic oils may be employed to carry the peroxide to the extruder.

Formation of Blend

Embodiments of the present invention are directed toward methods for preparing polymer blends. These methods uniquely and unexpectedly produce pellets of the polymer blend that have technologically useful properties including advantageous melt flow, mechanical and dynamic properties, and handling characteristics.

One or more embodiments of the present invention can be described with reference to FIG. 1. A blending process 10 is shown where a propylene-based elastomer is introduced with a propylene-based thermoplastic resin within a barrel location 12 within a reaction extruder (the entirety of which is not shown) to form an initial blend. The elastomer and the resin can be added via a feed throat using precise metering feeders such as loss-in-weight or volumetric screw feeder or a belt feeder. The elastomer and resin can be added separately at the same location or at different locations along the extruder. When added at separate locations, the constituents may be pre-masticated or plasticized using a side-extruder.

Those skilled in the art will also appreciate that the introduction of the elastomer and the resin can also occur outside of the extruder in a blender such as a ribbon blender or a tumbling blender, and the blend can be charged to the extruder without departing from the invention. The process may also be carried out in multiple staged extrusions—for instance, masterbatches of one or more of the polymers may be prepared in the first stage, followed by reactive extrusion in a subsequent stage. Masterbatches include dispersions of one or more of the polymeric ingredients, peroxides, anti-oxidants, UV and other stabilizers, and plasticizers. Masterbatches may be "dry mixes", by which is meant, a simple physical admixture that has not been "fully-wetted" or dispersed at the molecular level. For example, a "dry mix" is obtained when two ingredients are simply tumbled together in a tumbling mill or in a ribbon blender. A "dispersion" is obtained when the ingredients are mechanically worked and/or heated such that one or more of the ingredients melts and coats the other ingredient and/or disperses into the other ingredients.

The amount of propylene-based elastomer introduced with propylene-based thermoplastic resin can vary depending upon the properties that are ultimately desired. In one or more embodiments, the blend includes at least 50 parts by weight, in other embodiments at least 60 parts by weight, in other embodiments at least 70 parts by weight and in other embodiments at least 80 parts by weight of the propylene-based elastomer based upon the total weight of the propylene-based elastomer and the propylene-based thermoplastic resin. In these or other embodiments, the blend includes less than 98 parts by weight, in other embodiments less than 95 parts by weight, and in other embodiments less than 90 parts by weight of the propylene-based elastomer based upon the total weight of the propylene-based elastomer and the propylene-based thermoplastic resin.

In one or more embodiments, the blend includes at least 2 parts by weight, in other embodiments at least 5 parts by weight, in other embodiments at least 10 parts by weight, and in other embodiments at least 12 parts by weight of the propylene-based thermoplastic resin based upon the total weight of the propylene-based elastomer and the propylene-based thermoplastic resin. In these or other embodiments, the blend includes less than 50 parts by weight, in other embodiments less than 30 parts by weight, and in other embodiments less than 20 parts by weight of the propylene-based thermoplastic resin based upon the total weight of the propylene-based elastomer and the propylene-based thermoplastic resin.

In one or more embodiments, the reaction extruder includes those extruders that can perform reactive extrusion. These extruders include those continuous mixing extruders known in the art such as single-screw extruders, co-rotating intermeshing twin-screw extruders, and counter-rotating non-intermeshing twin-screw extruders, as well as other multi-screw extruders. These reaction extruders generally include a series of barrels that when connected form a passageway or conduit through which polymer may be conducted. The passageway may include two or more screws that are adapted with a plurality of elements that impact the progression of the polymer through each barrel. For example, the elements may primarily convey material though the barrels, they may serve to mix and masticate the material within the barrel, and/or they may primarily serve to restrict flow or induce back-mixing within one or more barrels. Once armed with a desired mixing sequence and strategy, those skilled in the art will be able to readily adapt the various elements of the various screws to achieve the desired sequence or strategy outlined herein.

With reference again to FIG. 1, the initial blend is then conveyed to a barrel location 14 where a peroxide is introduced to the initial blend to thereby form a reactive blend. The peroxide may be added as a liquid or a powder using separate feeders. Alternatively, the peroxide may be preblended with the propylene-based elastomer and/or the propylene-based thermoplastic resin, or with other ingredients used in the process, and then charged to the extruder.

The reactive blend is then conveyed to a zone of high-shear mixing 16, where the reactive blend undergoes intense mixing and masticating. This zone may include one or more barrels wherein the rotating shafts or screws of the extruder are equipped with high-shear kneading elements, as well as optional reverse and back-mixing elements that increase the residence time of the reactive blend within high-shear mixing zone 16. The combination of the shaft speed and the high-shear mixing from the kneading elements elevates the temperature of the reactive blend. In one or more embodiments, the temperature of the blend may also be increased by the use of external heating sources.

It is believed that the peroxide decomposes on heating and generates free radicals that react with the propylene-based elastomer and/or the propylene-based thermoplastic resin. It is also believed that peroxides affect the propylene-based elastomer and the propylene-based thermoplastic resin to different extents and by different mechanisms. Namely, it is believed that peroxide, under the appropriate conditions, primarily serves to sever or crack the propylene-based thermoplastic resin (a process known as vis-breaking) and thereby reduce the molecular weight. The peroxide is believed to also impact the methylene segments of the propylene-based elastomer to branch or crosslink the chains and thereby increase the molecular weight while lowering melt flow rate. Also, it is believed that free-radical chain ends of the propylene-based elastomer and the propylene-based thermoplastic resin may graft or react with each other and scramble chain segments, thereby resulting in constituents with block segments of each respective polymer ingredient (i.e., a block of the propylene-based elastomer and a block of the propylene-based thermoplastic resin).

It has unexpectedly been discovered that by maintaining a higher temperature and sufficient residence time at this higher temperature and/or high-shear mixing, advantageous product results. This unexpected discovery may stem from a difference in the way that the peroxide interacts or reacts with propylene-based elastomer and the propylene-based thermoplastic resin. That is, the peroxide may react with the propylene-based thermoplastic resin more quickly, under lesser shear, and at lower temperatures than the reaction with the propylene-based elastomer, and therefore the advantages associated with the reaction with the propylene-based elastomer can only be achieved with higher shear mixing, higher temperature, and/or longer residence time. Thus, while conventional practice may have sought to extract heat from the blend via means such as water cooling and/or use less aggressive mixing profiles, practice of the present invention includes maintaining conditions within high-shear mixing zone 16 so as to achieve sufficient peroxide decomposition to achieve desired material properties.

In one or more embodiments, the temperature of the reactive blend is maintained within high-shear mixing zone 16 at a temperature of at least 195° C., in other embodiments at least 205° C., in other embodiments at least 215° C., and in other embodiments at least 220° C. In these or other embodiments, the temperature is maintained below the decomposition temperature of the polymers or that temperature at which a deleterious amount of gel will be produced. In one or more embodiments, the temperature of the blend is maintained below 300° C., in other embodiments below 270° C., and in other embodiments below 250° C.

In one or more embodiments, the residence time that the reactive blend is maintained at the specified elevated temperatures may be at least 5 seconds, in other embodiments at least 10 seconds, in other embodiments at least 15 seconds, in other embodiments at least 20 seconds, in other embodiments at least 25 seconds, in other embodiments at least 30 seconds, and in other embodiments at least 35 seconds. In these or other embodiments, the residence time that reactive blend is maintained at the specified elevated temperatures may be less than 90 seconds, in other embodiments less than 80 seconds, in other embodiments less than 70 seconds, in other embodiments less than 60 seconds, and in other embodiment less than 50 seconds.

In view of the foregoing, those skilled in the art will also appreciate that the amount of peroxide employed is another variable that can be manipulated to achieve the desired reaction. In other words, the reaction sought between the polymers within the blend and the peroxide may be contingent upon the temperature, the residence time, and the concentration of the peroxide present. In one or more embodiments, the amount of peroxide introduced with the blend may be at least 500 ppm (weight), in other embodiments at least 1000 ppm, in other embodiments at least 1500 ppm, in other embodiments at least 2000 ppm, in other embodiments at least 2500 ppm, in other embodiments at least 3000 ppm, in other embodiments at least 3500 ppm, in other embodiments at least 4000 ppm, in other embodiments at least 4500 ppm, and in other embodiments at least 5000 ppm peroxide based upon the weight of the propylene-based elastomer and the propylene-based thermoplastic resin combined. In these or other embodiments, the amount of peroxide introduced with the blend may be less than 10,000 ppm, in other embodiments less than 8000 ppm, in other embodiments less than 6000 ppm peroxide, in other embodiments less than 5000 ppm, in other embodiments less than 4000 ppm, and in other embodiments less than 3000 ppm based upon the total parts by weight of the propylene-based elastomer and the propylene-based thermoplastic resin.

In other embodiments, the conditions within high-shear mixing zone 16 can be described with reference to the decomposition of the peroxide introduced to the mixture. In one or more embodiments, the conditions within high-shear mixing zone 16, including the temperature and residence time, are controlled to achieve at least 50%, in other embodiments at least 60%, in other embodiments at least 70%, in other embodiments at least 80%, in other embodiments at least 90%, in other embodiments at least 95%, and in other embodiments at least 99% decomposition (i.e., conversion) of the peroxide that is introduced to the blend. This conversion may occur entirely within high-shear mixing zone 16 or the conditions within high-shear mixing zone 16 may controlled to allow the desired conversion in downstream zones or barrels.

As shown in FIG. 1, volatile compounds present within high-shear mixing zone 16 can optionally be removed from high-shear mixing zone 16 though an outlet 18, which may include a vent section within the extruder. A vacuum pump (not specifically shown) can be used to improve the devolatilization and removal of volatiles.

In addition to outlet 18 or in lieu of outlet 18, volatile compounds can optionally be removed from a conveying zone 20, which will be described herein below, via an outlet 22. Outlet 22, like outlet 8, may include a vent section within the extruder and a vacuum pump to improve the devolatilization and removal of volatiles.

It is believed that the free radical decomposition of the peroxide may produce volatile gases such as methane and hydrogen, as well as oxygen-bearing compounds such as, but not limited to, acetone, alcohols such as t-butyl alcohols, and aldehydes such as formaldehyde. Moisture present in the raw material feeds may also generate water vapor. These vapors and gases, including entrapped air or nitrogen that enters the extruder along with the raw material feeds can be removed as volatile compounds. It has unexpectedly been discovered that the removal of these volatile compounds has a positive impact on the subsequent pelletization step, which will be described herein below.

With reference again to FIG. 1, the reactive blend is conveyed away from high-shear mixing zone 16 via conveying zone 20 where the reactive blend may complete its conversion from a reactive blend to a reacted blend. Also, the reacted blend may be allowed to cool within conveying zone 20. Those skilled in the art will appreciate that the temperature of the reacted blend should be maintained at temperatures sufficient to maintain adequate flow of the blend, but the temperature need not, and is desirably not, maintained at the high temperatures maintained upstream where peroxide decomposition and reaction was sought.

In one or more embodiments, an antioxidant can be introduced with the reacted blend. For example, as shown in FIG. 1, an antioxidant can be added via a feeder 24 as the reacted blend is conveyed away from high-shear mixing zone 16. In one or more embodiments, one or more antioxidants are introduced together with a carrier material such as a plasticizer, an extender oil, or other low molecular weight material. In one or more embodiments, the antioxidant together with the low viscosity material may be injected into a barrel of the extruder as a slurry.

In one or more embodiments, the antioxidant is an alkylated phenol such as 2,6-di-tert-butylphenol (2,6-DTBP), a butylated hydroxyl toluene such as 2,6-bis(1,1-dimethylethyl)-4-methylphenol), and/or a phosphite such as tris(2,4-di-(tert)-butylphenyl)phosphite. The low molecular weight compounds that may be introduced with the antioxidant include paraffinic oils such as highly purified paraffinic oils and disclosed above. An example of a useful oil is that available under the trade name SPECTRASYN (ExxonMobil Chemical Co.).

In one or more embodiments, after the optional introduction of the antioxidant or other optional materials, which may be introduced to the blend within the extruder, the reacted blend may enter a pressure increasing zone 26, which serves to increase the force and/or flow rate of the reacted blend and thereby facilitate transfer of the reacted blend through a die plate (not shown). Pressure increasing zone 26 may include extruder screw segments that are designed to generate adequate or increased pressure. In other embodiments, pressure increasing zone 26 may include a gear pump. The use of a gear pump advantageously helps minimize process upsets and isolate the extruder from the pressure changes associated with downstream treatment, such as screening, which will be described below. Thus, it should be appreciated that pressure increasing zone 26 may be located within one or more barrels of the extruder or may be external to the extruder.

Pressure-increasing zone 26 may also serve to facilitate passing the reacted blend through one or more screens 28, which can be used to remove contaminates such as metal chips, polymeric gels, and/or unmelted pellets of raw material. This step of screening may take place within the extruder or after or upon exit of the reacted blend from the extruder. In particular embodiments, screens are installed between the extruder outlet and a die plate.

In one or more embodiments, the reacted blend is pelletized or granulated at pelletizer 30. In one or more embodiments, the reacted product, as a hot extrudate, is passed through a specially constructed die plate that shapes the product into a ribbon that is drawn out using a rotating drum. The drum is water cooled and/or placed in a water trough for quenching the hot extrudate. The ribbon is then cut or ground into small chips that may range in size from about 0.5 mm to about 20 mm. The width of the die hole determines the thickness of the pellets.

In other embodiments, a die plate with multiple holes, which may range in width from about 0.5 mm to about 20 mm, is employed. The reacted blend, which is generally in the form of molten stands or ropes, is cut into little pellets that are typically cylindrical in shape. The length of the pellets is can be altered by manipulating the speed of the blades on the cutter or by changing the distance between blades.

In one or more embodiments, an underwater pelletizer is employed. The reacted blend, in the form of a molten extrudate, is forced through a die plate containing one or more die-holes. The die plate may be heated and/or cooled to adjust the viscosity of the blend to make it more suitable for pelletization. Electric heaters may be used to control the die temperature. Alternately, tempered oil, water, steam and/or other heater transfer oils may be used to regulate the die temperature. The extrudate flowing out of the die holes can be quenched using a rapidly flowing stream of water in the water chamber of the underwater pelletizer. In particular embodiments, a diverter is used to enhance the water flow at the die plate and improve pelletization. In these or other embodiments, the number of blades on the pelletizer hub is varied to obtain the desired pellet size. In these or other embodiments, the rotary speed of the pelletizer knives adjusted to obtain desired pellets.

In particular embodiments, the water is treated with (or includes) an anti-block agent or dispersant. These agents assist in keeping the pellets from agglomerating. In particular embodiments, calcium stearate powder is dispersed in the pelletizer water to minimize agglomeration.

In other embodiments, the water in which the extrudate is pelletized is chilled by using a refrigeration source. In one or more embodiments, the temperature of the water is chilled to temperatures below 50° C., in other embodiments below 40° C., in other embodiments below 30° C., in other embodiments below 20° C., and in other embodiments below 10° C.

The pellets may then be carried in a stream of water to a spin dryer, shaker screen, vibrating conveyor, fluidized bed dryer, or other drying apparatus where the water can be screened out using centrifugal or gravitational forces. The pellets may then be screened to remove oversize pellets and fines. A fluidized bed dryer may be used to further enhance the drying of the pellets. Pellets of the desired size range may then be pneumatically conveyed to holding bins or silos, which may be designed to provide appropriate residence time and/or blending to provide a uniform size for packaging. The product may then be packaged in super sacks or cardboard boxes. Alternatively, the product may be loaded on to railcars, totes, or bulk bins for transportation. Or, the product may be packaged in bags using manual or automated bagging machines or "form-fill-and-seal" bagging equipment.

In one or more embodiments, the reacted blend may be supplied directly to melt spinning or melt blowing apparatuses. By supplied directly, it is meant that the reacted blend is supplied to the melt spinning or melt blowing apparatus without first being pelletized. Thus, in one or more embodiments the reacted blend is not pelletized or solidified before being directed to a melt spinning or melt blowing apparatus.

In one or more embodiments, the reacted blend may be meltblown into various fiber and nonwoven compositions (e.g., fabrics) as described below. For example, in a meltblown process, the reacted blend may pass through the reactive extruder outlet to a meltblowing apparatus, where the reactive blend is extruded through a plurality of fine, usually circular, die capillaries as molten threads or filaments into high velocity, usually hot, gas streams which attenuate the filaments of the resulting molten thermoplastic material to reduce their diameter. Thereafter, the meltblown fibers are carried by the high velocity gas stream and are deposited on a collected surface to form a web or nonwoven fabric of randomly dispersed meltblown fibers. Meltblowing processes are generally described in, for example, U.S. Pat. Nos. 3,849, 241 and 6,268,203. The meltblown process may utilize an extrusion system having a relatively high throughput, in excess of 0.3 grams per hole per minute ("ghm"), or in excess of 0.4 ghm, or in excess of 0.5 ghm, or in excess of 0.6 ghm, or in excess of 0.7 ghm.

In one or more embodiments, the reacted blend may be spunbond into various fiber and nonwoven compositions (e.g., fabrics) as described below. For example, the reactive blend may pass through the reactive extruder outlet to a spinneret where the blend is fiberized as passed through fine openings arranged in one or more rows in the spinneret, forming a curtain of filaments. The filaments are usually quenched with air at a low temperature, drawn, usually pneumatically, and deposited on a moving mat, belt, or "forming wire" to form the nonwoven composition. See, for example, the spunbond processes described in U.S. Pat. Nos. 4,340, 563; 3,692,618; 3,802,817; 3,338,992; 3,341,394; 3,502,763; and U.S. Pat. No. 3,542,615. The term spunbond as used herein is meant to include spunlace processes, in which the filaments are entangled to form a web using high-speed jets of water (known as "hydroentanglement"). The spunbond fibers may have a diameter in the range of from about 10 to about 50 microns, depending on the process conditions and the desired end use for the fabrics to be produced from such fibers. Changes in the quench air temperature and pneumatic draw process may be used to alter the fiber diametner.

Product Characteristics

In one more embodiments, the polymer blend resulting from the process of this invention are characterized by one or more advantageous properties. In one or more embodiments, the blend is characterized by a melt flow rate, as determined by ASTM D-1238, 2.16 kg weight @230° C., of at least 60 dg/min, in other embodiments at least 80 dg/min, in other embodiments at least 100 dg/min, in other embodiments at least 150 dg/min, in other embodiments at least 170 dg/min, and in other embodiments at least 190 dg/min. In these or other embodiments, the melt flow rate of the blend may be less than 800 dg/min, in other embodiments less than 500, in other embodiments less than 400, in other embodiments less than 300, in other embodiments less than 250 dg/min, in other embodiments less than 230 dg/min, and in other embodiments less than 210 dg/min.

Industrial Applicability

The polymer blend resulting from the process of this invention may be employed to prepare non-woven fabrics. The formation of non-woven fabrics from the foregoing compositions may include manufacture of fibers by extrusion followed by weaving or bonding. The extrusion process may be accompanied by mechanical or aerodynamic drawing of the fibers. The fiber and fabrics of the present invention may be manufactured by any technique and/or equipment known in the art, many of which are well known. For example, spunbond non-woven fabrics may be produced by spunbond non-woven production lines produced by Reifenhauser GmbH & Co., of Troisdorf, Germany. The Reifenhasuer system utilizes a slot drawing technique as revealed in U.S. Pat. No. 4,820, 142.

In one or more embodiments, fibers may be produced by continuous filament, bulked continuous filament, or staple fiber-formation techniques. For example, the polymer melt may be extruded through the holes in the die (spinneret), which may, for example be, between, 0.3 mm to 0.8 mm in diameter. Low melt viscosity of the polymer may be achieved through the use of high melt temperature (e.g., 230° C. to 280° C.) and high melt flow rates (e.g., 15 g/10 min to 40 g/10 min) of the polymers used. A relatively large extruder may be equipped with a manifold to distribute a high output of molten polymer to a bank of eight to twenty spinnerets. Each spinhead may be equipped with a separate gear pump to regulate output through that spinhead; a filter pack, supported by a "breaker plate;" and the spinneret plate within the head. The number of holes in the spinneret plate determines the number of filaments in a yam and varies considerably with the different yarn constructions, but it is typically in the range of 50 to 250. The holes can be grouped into round, annular, or rectangular patterns to assist in good distribution of the quench air flow.

Continuous Filament

Continuous filament yarns can range from 40 denier to 2,000 denier (denier=number of grams/9000 yd). Filaments can range from 1 to 20 denier per filament (dpf), although larger ranges are contemplated. Spinning speeds may include 800 m/min to 1500 m/min (2500 ft/min to 5000 ft/min). An exemplary method would proceed as follows. The filaments are drawn at draw ratios of 3:1 or more (one- or two-stage draw) and wound onto a package. Two-stage drawing allows higher draw ratios to be achieved. Winding speeds are 2,000 m/min to 3,500 m/min (6,600 ft/min to 11,500 ft/min) Spinning speeds in excess of 900 m/min (3000 ft/min) may require a narrow molecular weight distribution to get the best spinnability with the finer filaments. Resins with a minimum MFR of 5 and a narrow molecular weight distributor, with a polydispersity index (PI) under 2.8 for example. In slower spinning processes, or in heavier denier filaments, a 16-MFR reactor grade product is may be more appropriate.

Partially Oriented Yarn (POY)

Partially oriented yarn (POY) is the fiber produced directly from fiber spinning without solid state drawing (as continuous filament mentioned above). The orientation of the molecules in the fiber is done only in the melt state just after the molten polymer leaves the spinneret. Once the fiber is solidified, no drawing of the fiber takes place and the fiber is wounded up into a package. The POY yarn (as opposed to fully oriented yarn, or FOY, which has gone through solid state orientation and has a higher tensile strength and lower elongation) tends to have a higher elongation and lower tenacity.

Bulked Continuous Filament

Bulked continuous filament fabrication processes fall into two basic types, one-step and two steps. For example, in a two-step process, an undrawn yarn is spun at less than 1,000 m/min (3,300 ft/min), usually 750 m/min, and placed on a package. The yarn is drawn (usually in two stages) and "bulked" on a machine called a texturizer. Winding and drawing speeds are limited by the bulking or texturizing device to 2,500 m/min (8,200 ft/min) or less. As in the two-step CF process, secondary crystallization requires prompt draw texturizing. Common processes include one-step spin/draw/text (SDT) processes. This process may provide better economics, efficiency and quality than the two-step process. They are similar to the one-step CF process, except that the bulking device is in-line. Bulk or texture may change yarn appearance, separating filaments and adding enough gentle bends and folds to make the yarn appear fatter (bulkier).

Staple Fiber

Fiber fabrication processes include two processes: traditional and compact spinning The traditional process typically involves two steps: i) producing, applying finish, and winding followed by ii) drawing, a secondary finish application, crimping, and cutting into staple. Filaments can range, for example, from 1.5 dpf to >70 dpf, depending on the application. Staple length can be as short as 7 mm or as long as 200 mm (0.25 in. to 8 in.) to suit the application. For many applications, the fibers are crimped. Crimping is accomplished by over-feeding the tow into a steam-heated stuffer box with a pair of nip rolls. The over-feed folds the tow in the box, forming bends or crimps in the filaments. These bends may be heat-set by steam injected into the box. The MW, MWD, and isotactic content of the resin can affect crimp stability, amplitude, and ease of crimping.

Melt Blown Fabrics

Melt blown fabrics may refer to webs of fine filaments having fiber diameter in the range of 20 to 0.1 microns. Fiber diameters of melt blown fibers may be in the range of 1 to 10 microns, or in other embodiments from 1 to about 5 microns. The non-woven webs formed by these fine fiber diameters have very small pore sizes and therefore may have excellent barrier properties. For example, in the melt blown process, the extruder melts the polymer and delivers it to a metering melt pump. The melt pump delivers the molten polymer at a steady output rate to the special melt blowing die. As the molten polymer exits the die, they are contacted by high temperature, high velocity air (called process or primary air). This air rapidly draws and, in combination with the quench air, solidifies the filaments. The entire fiber forming process typically takes place within several inches of the die. Die design can be important to producing a quality product efficiently. The fabric is formed by blowing the filaments directly onto a porous forming belt, typically 200 mm to 400 mm (8 in. to 15 in.) from the spinnerets. A larger forming distance may be used for heavier basis weight, higher loft product. Melt blowing may require very high melt flow rate resins such as those greater than 200 g/10 min, to obtain the finest possible fibers, although resin MFR as low as 20 g/10 min can be used at a higher processing temperature in other embodiments.

Spunbonded Fabric

Spunbond or spunbonded fibers include fibers produced, for example, by the extrusion of molten polymer from either a large spinneret having several thousand holes or with banks of smaller spinnerets, for example, containing as few as 40 holes. After exiting the spinneret, the molten fibers are quenched by a cross-flow air quench system, then pulled away from the spinneret and attenuated (drawn) by high speed air. There are generally two methods of air attenuation, both of which use the venturi effect. The first draws the filament using an aspirator slot (slot draw), which may run the width of the spinneret or the width of the machine. The second method draws the filaments through a nozzle or aspirator gun. Filaments formed in this manner may be collected on a screen ("wire") or porous forming belt to form the web. The web can then be passed through compression rolls and then between heated calendar rolls where the raised lands on one roll bond the web at points covering, for example, 10% to 40% of its area to form a non-woven fabric. In another embodiment, welding of the fibers can also be effected using convection or radiative heat. In yet another embodiment, fiber welding can be effected through friction by using hydro entangling or needle punch methods.

Annealing may be done after the formation of fiber in continuous filament or fabrication of a non-woven material from the fibers. Annealing may partially relieve the internal stress in the stretched fiber and restore the elastic recovery properties of the blend in the fiber. Annealing has been shown to lead to significant changes in the internal organization of the crystalline structure and the relative ordering of the amorphous and semicrystalline phases. This may lead to recovery of the elastic properties. For example, annealing the fiber at a temperature of at least 40° C., above room temperature (but slightly below the crystalline melting point of the blend), may be adequate for the restoration of the elastic properties in the fiber.

Thermal annealing of the fibers can be conducted by maintaining the fibers (or fabrics made from the fibers) at temperatures, for example, between room temperature up to 160° C., or alternatively to a maximum of 130° C. for a period between a few seconds to less than 1 hour. A typical annealing period is 1 to 5 minutes at 100° C. The annealing time and temperature can be adjusted based upon the composition employed. In other embodiments, the annealing temperature ranges from 60° C. to 130° C. In another embodiment, the temperature is about 100° C.

In certain embodiments, for example, conventional continuous fiber spinning, annealing can be done by passing the fiber through a heated roll (godet), without the application of conventional annealing techniques. Annealing may desirably be accomplished under very low fiber tension to allow shrinking of the fiber in order to impart elasticity to the fiber. In non-woven processes, the web usually passes through a calender to point bond (consolidate) the web. The passage of the unconsolidated non-woven web through a heated calender at relatively high temperature may be sufficient to anneal the fiber and increase the elasticity of the non-woven web. Similar to fiber annealing, the non-woven web may desirably be accomplished under low tension to allow for shrinkage of the web in both machine direction (MD) and cross direction (CD) to enhance the elasticity of the non-woven web. In other embodiments, the bonding calender roll temperature ranges from 100° C. to 130° C. In another embodiment, the temperature is about 100° C. The annealing temperature can be adjusted for any particular blend.

The fibers and non-woven fabrics of the present invention can be employed in several applications. In one or more embodiments, they may be advantageously employed in diapers and/or similar personal hygiene articles such as adult incontinence apparel. In particular, they can be employed as the dynamic or stretchable components of these articles such as, but not limited to, the elastic fastening bands. In other embodiments, the fibers and non-woven fabrics may be fabricated into other protective garments or covers such as medical gowns or aprons, bedding, or similar disposable garments and covers.

In other embodiments, the fibers and fabrics of the present of the present invention can be employed in the manufacture of filter media. For example, particular applications include use in functionalized resins where the non-woven fabric can be electrostatically charged to form an electret.

Specific Embodiments

Paragraph A: A method for forming a polymer blend, the method comprising: (i) charging to a reactive extruder a first polymer and a second polymer to form an initial blend, where the first polymer is a propylene-based elastomer including up to 35% by weight ethylene-derived units and a heat of fusion, as determined according to DSC procedures according to ASTM E-793, of less than 80 J/g and a melt temperature of less than 110° C., where the second polymer is a propylene-based polymer having a melt temperature in excess of 110° C. and a heat of fusion in excess of 80 J/g; (ii) after said step of charging, charging a peroxide to the initial blend to thereby form a reactive blend; (iii) conducting the reactive blend at a flow rate through a series of barrels within the extruder; (iv) subjecting the reactive blend, in one or more barrels, to high shear mixing; (v) maintaining the temperature of the reactive blend at a temperature sufficient to decompose at least 50% of the peroxide and thereby form a reacted blend; (vi) restricting flow rate of the reacted blend through one or more barrels to increase the time that the reactive blend is subjected to the high shear mixing; (vii) removing compounds from the reacted blend or the reactive blend; (viii) introducing an antioxidant to the reacted blend; (ix) increasing flow rate of the reacted blend through one or more barrels; (x) after said step of increasing the flow rate, passing the reacted blend through one or more screens to thereby remove unwanted contaminates; and (xi) pelletizing the reacted blend.

Paragraph B: The process of paragraph A, where said step (v) includes maintaining the temperature of the reactive blend at a temperature sufficient to decompose at least 70% of the peroxide.

Paragraph C: The process of paragraphs A-B, where said step (v) includes maintaining the temperature of the reactive blend at a temperature sufficient to decompose at least 90% of the peroxide.

Paragraph D: The process of paragraphs A-C, where said step (v) includes maintaining the temperature of the reactive blend to at least 165° C.

Paragraph E: The process of paragraphs A-D, where said step (v) includes maintaining the temperature of the reactive blend to at least 185° C.

Paragraph F: The process of paragraphs A-E, where said step (iii) includes is charging at least 1,000 ppm peroxide based upon the weight of the propylene-based elastomer and the propylene-based thermoplastic resin combined.

Paragraph G: The process of paragraphs A-F, where said step (iii) includes charging at least 3,000 ppm peroxide based upon the weight of the propylene-based elastomer and the propylene-based thermoplastic resin combined.

Paragraph H: A method for forming a polymer blend, the method comprising: (i) charging to a reactive extruder a first polymer and a second polymer to form a blend, where the first polymer is a propylene-based elastomer including up to 35% by weight ethylene-derived units and a heat of fusion, as determined according to DSC procedures according to ASTM E-793, of less than 80 J/g and a melt temperature of less than 110° C., where the second polymer is a propylene-based polymer having a melt temperature in excess of 110° C. and a heat of fusion in excess of 80 J/g; (ii) after said step of charging, charging a peroxide to the blend to thereby form a reactive blend; (iii) conducting the reactive blend at a flow rate through a series of barrels within the extruder; (iv) subjecting the reactive blend, in one or more barrels, to high shear mixing; (v) maintaining the temperature of the reactive blend at a temperature of at least 165° C. for at least 5 seconds and thereby form a reacted blend; (vi) restricting flow rate of the reacted blend through one or more barrels to increase the time that the reactive blend is subjected to the high shear mixing; (vii) removing compounds from the reacted blend or the reactive blend; (viii) introducing an antioxidant to the reacted blend; (ix) increasing flow rate of the reacted blend through one or more barrels; (x) after said step of increasing the flow rate, passing the reacted blend through one or more screens to thereby remove unwanted contaminates; and (xi) pelletizing the reacted blend.

Paragraph I: The process of paragraph H, where said step (v) includes maintaining the temperature of the reactive blend at a temperature of at least 185° C. for at least 15 seconds.

Paragraph J: The process of paragraphs H-I, where said step (v) includes maintaining the temperature of the reactive blend at a temperature of at least 185° C. for at least 20 seconds.

Paragraph K: The process of paragraphs H-J, where said step (v) includes maintaining the temperature of the reactive blend at a temperature of at least 185° C. for at least 30 seconds.

Paragraph L: The process of paragraphs H-K, where said step (iii) includes charging at least 1,000 ppm peroxide based upon the weight of the propylene-based elastomer and the propylene-based thermoplastic resin combined.

Paragraph M: The process of paragraphs H-L, where said step (iii) includes charging at least 3,000 ppm peroxide based upon the weight of the propylene-based elastomer and the propylene-based thermoplastic resin combined.

Paragraph N: A composition prepared by the process of any of the preceding paragraphs A-M.

Paragraph O: The composition of paragraph N comprising at least one block segment of the first polymer and at least one block segment of the second polymer.

Paragraph P: A method for forming one or more fibers, the method comprising: (i) charging to a reactive extruder a first polymer and a second polymer to form an initial blend, where the first polymer is a propylene-based elastomer including up to 35% by weight ethylene-derived units and a heat of fusion, as determined according to DSC procedures according to ASTM E-793, of less than 80 J/g and a melt temperature of less than 110° C., where the second polymer is a propylene-based polymer having a melt temperature in excess of 110° C. and a heat of fusion in excess of 80 J/g; (ii) after said step of charging, charging a peroxide to the initial blend to thereby form a reactive blend; (iii) conducting the reactive blend at a flow rate through a series of barrels within the extruder; (iv) subjecting the reactive blend, in one or more barrels, to high shear mixing; (v) maintaining the temperature of the reactive blend at a temperature sufficient to decompose at least 50% of the peroxide and thereby form a reacted blend; (vi) restricting flow rate of the reacted blend through one or more barrels to increase the time that the reactive blend is subjected to the high shear mixing; (vii) increasing flow rate of the reacted blend through one or more barrels; (viii) after said step of increasing the flow rate, passing the reacted blend through one or more screens to thereby remove unwanted contaminates; (ix) extruding the reacted blend through a plurality of die capillaries to form one or more molten threads or filaments; and (x) attenuating the molten threads or filaments in a gas stream to form one or more meltblown fibers.

Paragraph Q: The process of Paragraph P, where the reacted blend is extruded through the plurality of die capillaries at a rate greater than or equal to 0.3 grams per hole per minute.

Paragraph R: The process of Paragraph P or Q, wherein the process further comprises depositing the meltblown fibers on a collecting surface to form a web or fabric.

Paragraph S: A method for forming one or more fibers, the method comprising: (i) charging to a reactive extruder a first polymer and a second polymer to form an initial blend, where the first polymer is a propylene-based elastomer including up to 35% by weight ethylene-derived units and a heat of fusion, as determined according to DSC procedures according to ASTM E-793, of less than 80 J/g and a melt temperature of less than 110° C., where the second polymer is a propylene-based polymer having a melt temperature in excess of 110° C. and a heat of fusion in excess of 80 J/g; (ii) after said step of charging, charging a peroxide to the initial blend to thereby form a reactive blend; (iii) conducting the reactive blend at a flow rate through a series of barrels within the extruder; (iv) subjecting the reactive blend, in one or more barrels, to high shear mixing; (v) maintaining the temperature of the reactive blend at a temperature sufficient to decompose at least 50% of the peroxide and thereby form a reacted blend; (vi) restricting flow rate of the reacted blend through one or more barrels to increase the time that the reactive blend is subjected to the high shear mixing; (vii) increasing flow rate of the reacted blend through one or more barrels; (viii) after said step of increasing the flow rate, passing the reacted blend through one or more screens to thereby remove unwanted contaminates; (xi) introducing the reacted blend to a spinneret to form one or more filaments; and (x) quenching the filaments with air to form one or more fibers.

Paragraph T: The process of Paragraph S, wherein the process further comprises depositing the fibers on a collecting surface to form a web or fabric.

Paragraph U: The process of any one of Paragraphs P-T, where said step (v) includes maintaining the temperature of the reactive blend at a temperature sufficient to decompose at least 70% of the peroxide.

Paragraph V: The process of any one of Paragraphs P-U, where said step (v) includes maintaining the temperature of the reactive blend at a temperature sufficient to decompose at least 90% of the peroxide.

Paragraph W: The process of any one of Paragraphs P-V, where said step (v) includes maintaining the temperature of the reactive blend to at least 165° C.

Paragraph X: The process of any one of Paragraphs P-W, where said step (v) includes maintaining the temperature of the reactive blend to at least 185° C.

Paragraph Y: The process of any one of Paragraphs P-X, where said step (iii) includes charging at least 1,000 ppm peroxide based upon the weight of the propylene-based elastomer and the propylene-based thermoplastic resin combined.

Paragraph Z: The process of any one of Paragraphs P-Y, where said step (iii) includes charging at least 3,000 ppm peroxide based upon the weight of the propylene-based elastomer and the propylene-based thermoplastic resin combined.

Paragraph AA: The process of any one of Paragraphs P-Z, wherein the process further comprises introducing an antioxidant to the reacted blend.

Paragraph BB: A method for forming one or more fibers, the method comprising: (i) charging to a reactive extruder a first polymer and a second polymer to form an initial blend, where the first polymer is a propylene-based elastomer including up to 35% by weight ethylene-derived units and a heat of fusion, as determined according to DSC procedures according to ASTM E-793, of less than 80 J/g and a melt temperature of less than 110° C., where the second polymer is a propylene-based polymer having a melt temperature in excess of 110° C. and a heat of fusion in excess of 80 J/g; (ii) after said step of charging, charging a peroxide to the initial blend to thereby form a reactive blend; (iii) conducting the reactive blend at a flow rate through a series of barrels within the extruder; (iv) subjecting the reactive blend, in one or more barrels, to high shear mixing; (v) maintaining the temperature of the reactive blend at a temperature of at least 165° C. for at least 5 seconds and thereby form a reacted blend; (vi) restricting flow rate of the reacted blend through one or more barrels to increase the time that the reactive blend is subjected to the high shear mixing; (vii) increasing flow rate of the reacted blend through one or more barrels; (viii) after said step of increasing the flow rate, passing the reacted blend through one or more screens to thereby remove unwanted contaminates; (ix) extruding the reacted blend through a plurality of die capillaries to form molten threads or filaments; and (x) attenuating the molten threads or filaments in a gas stream to form meltblown fibers.

Paragraph CC: The process of Paragraph BB, where the reacted blend is extruded through the plurality of die capillaries at a rate greater than or equal to 0.3 grams per hole per minute.

Paragraph DD: The process of Paragraph BB or CC, wherein the process further comprises depositing the meltblown fibers on a collecting surface to form a web or fabric.

Paragraph EE: A method for forming a fiber, the method comprising: (i) charging to a reactive extruder a first polymer and a second polymer to form a blend, where the first polymer is a propylene-based elastomer including up to 35% by weight ethylene-derived units and a heat of fusion, as determined according to DSC procedures according to ASTM E-793, of less than 80 J/g and a melt temperature of less than 110° C., where the second polymer is a propylene-based polymer having a melt temperature in excess of 110° C. and a heat of fusion in excess of 80 J/g; (ii) after said step of charging, charging a peroxide to the blend to thereby form a reactive blend; (iii) conducting the reactive blend at a flow rate through a series of barrels within the extruder; (iv) subjecting the reactive blend, in one or more barrels, to high shear mixing; (v) maintaining the temperature of the reactive blend at a temperature of at least 165° C. for at least 5 seconds and thereby form a reacted blend; (vi) restricting flow rate of the reacted blend through one or more barrels to increase the time that the reactive blend is subjected to the high shear mixing; (vi) increasing flow rate of the reacted blend through one or more barrels; (viii) after said step of increasing the flow rate, passing the reacted blend through one or more screens to thereby remove unwanted contaminates; (ix) introducing the reacted blend to a spinneret to form one or more filaments; and (x) quenching the filaments with air to form one or more fibers.

Paragraph FF: The process of Paragraph EE, wherein the process further comprises depositing the fibers on a collecting surface to form a web or fabric.

Paragraph GG: The process of any one of Paragraphs BB to FF, where said step (v) includes maintaining the temperature of the reactive blend at a temperature of at least 185° C. for at least 15 seconds.

Paragraph HH: The process of any one of Paragraphs BB to GG, where said step (v) includes maintaining the temperature of the reactive blend at a temperature of at least 185° C. for at least 20 seconds.

Paragraph II: The process of any one of Paragraphs BB to HH, where said step (iii) includes charging at least 1,000 ppm peroxide based upon the weight of the propylene-based elastomer and the propylene-based thermoplastic resin combined.

Paragraph JJ: The process of any one of Paragraphs BB to II, where said step (iii) includes charging at least 3,000 ppm peroxide based upon the weight of the propylene-based elastomer and the propylene-based thermoplastic resin combined.

Paragraph KK: The process of any one of Paragraphs BB to JJ, wherein the process further comprises introducing an antioxidant to the reacted blend.

Paragraph LL: A fiber prepared by the process of any one of Paragraphs P-KK.

Paragraph MM: A nonwoven composition formed by the fibers of Paragraph LL.

In order to demonstrate the practice of the present invention, the following examples have been prepared and tested. The examples should not, however, be viewed as limiting the scope of the invention. The claims will serve to define the invention.

EXAMPLES

Example 1

A process in accordance with the present invention was demonstrated using a BERSTORFF ZE-90A (Berstorff) co-rotating, intermeshing, twin-screw extruder. The is copolymer of propylene and ethylene, containing about 15 wt % of ethylene was metered into the feed throat of the extruder using a loss-in-weight screw feeder. A predominantly isotactic homopolymer polypropylene was fed into the same feed throat using another loss-in-weight screw feeder. The blend was treated by vis-breaking in the presence of a peroxide obtained under the tradename LUPEROX 101 (Arkema). The barrel sections were assembled as described in Table I.

TABLE I

| Barrel Number | Type | Length mm | Cumulative mm | Cumulative L/D |
|---|---|---|---|---|
| 1 | Feed Barrel | 450 | 450 | 5 |
| 2 | Top Liquid Injector | 450 | 900 | 10 |
| 3 | Top Liquid Injector | 450 | 1350 | 15 |
| 4 | Closed | 450 | 1800 | 20 |
| 4.5 | Transition | 90 | 1890 | 21 |
| 5 | Top Vent | 450 | 2340 | 26 |
| 6 | Side Feed | 450 | 2790 | 31 |
| 7 | Closed | 450 | 3240 | 36 |
| 8 | Top Vent | 450 | 3690 | 41 |

TABLE I-continued

| Barrel Number | Type | Length mm | Cumulative mm | Cumulative L/D |
|---|---|---|---|---|
| 9 | Side Feed | 450 | 4140 | 46 |
| 10 | Closed | 450 | 4590 | 51 |
| 10.5 | Transition | 205 | 4795 | |
| | Screen Pack | 305 | 5100 | |
| | Transition | 150 | 5250 | |

TABLE I-continued

| Barrel Number | Type | Length mm | Cumulative mm | Cumulative L/D |
|---|---|---|---|---|
| | Die Plate Pelletizer | 60 | 5310 | |

The screw segments were assembled as shown in Table II.

TABLE II

Extruder Berstorff Size 90A

| Type | Pitch | Ratio Length/Pitch or Lobes | Nr. of Starts Or Angle | Handing | Piece Length mm | Cumulative Length, mm | Barrel |
|---|---|---|---|---|---|---|---|
| EA | 75 | 1 | 2 | | 75 | 75 | 1 |
| A | 125 | 1 | 2 | | 125 | 200 | 1 |
| A | 125 | 1 | 2 | | 125 | 325 | 1 |
| A | 125 | 1 | 2 | | 125 | 450 | 1 |
| EA | 125 | 1 | 2 | | 125 | 575 | 2 |
| KB | 75 | 5 | 45 | LI | 75 | 650 | 2 |
| EA | 100 | 1 | 2 | | 100 | 750 | 2 |
| EA | 75 | 1 | 2 | | 75 | 825 | 2 |
| EA | 75 | 1 | 2 | | 75 | 900 | 2 |
| KB | 75 | 5 | 45 | LI | 75 | 975 | 3 |
| KB | 75 | 5 | 45 | LI | 75 | 1050 | 3 |
| KB | 75 | 5 | 45 | LI | 75 | 1125 | 3 |
| KB | 75 | 5 | 45 | RE | 75 | 1200 | 3 |
| EA | 75 | 1 | 2 | | 75 | 1275 | 3 |
| EA | 75 | 1 | 2 | | 75 | 1350 | 3 |
| KB | 125 | 5 | 45 | LI | 125 | 1475 | 4 |
| KB | 125 | 5 | 90 | LI | 125 | 1600 | 4 |
| EA | 100 | 0.5 | 2 | RE | 50 | 1650 | 4 |
| EA | 100 | 1 | 2 | | 100 | 1750 | 4 |
| KB | 125 | 5 | 45 | LI | 125 | 1875 | 5 |
| KB | 125 | 5 | 90 | LI | 125 | 2000 | 5 |
| EA | 100 | 1 | 2 | | 100 | 2100 | 5 |
| ZB | 75 | 3 | 12 | RE-LI | 75 | 2175 | 5 |
| ZB | 75 | 3 | 12 | RE-LI | 75 | 2250 | 5 |
| KB | 125 | 5 | 90 | | 125 | 2375 | 6 |
| EA | 100 | 1 | 2 | | 100 | 2475 | 6 |
| ZB | 75 | 3 | 12 | RE-LI | 75 | 2550 | 6 |
| ZB | 75 | 3 | 12 | RE-LI | 75 | 2625 | 6 |
| KB | 75 | 5 | 90 | | 75 | 2700 | 6 |
| | 100 | 1 | 2 | | 100 | 2800 | 7 |
| ZB | 75 | 3 | 12 | RE-LI | 75 | 2875 | 7 |
| ZB | 75 | 3 | 12 | RE-LI | 75 | 2950 | 7 |
| EA | 100 | 1 | 2 | | 100 | 3050 | 7 |
| EA | 100 | 1 | 2 | | 100 | 3150 | 7 |
| EA | 100 | 1 | 2 | | 100 | 3250 | 8 |
| A | 125 | 1 | 2 | | 125 | 3375 | 8 |
| A | 125 | 1 | 2 | | 125 | 3500 | 8 |
| A | 125 | 1 | 2 | | 125 | 3625 | 8 |
| A | 125 | 1 | 2 | | 125 | 3750 | 9 |
| EA | 100 | 1 | 2 | | 100 | 3850 | 9 |
| EA | 100 | 1 | 2 | | 100 | 3950 | 9 |
| EA | 75 | 1 | 2 | | 75 | 4025 | 9 |
| EA | 75 | 1 | 2 | | 75 | 4100 | 9 |
| EA | 75 | 1 | 2 | | 75 | 4175 | 10 |
| EA | 75 | 1 | 2 | | 75 | 4250 | 10 |
| EA | 75 | 1 | 2 | | 75 | 4325 | 10 |
| EA | 75 | 1 | 2 | | 75 | 4400 | 10 |
| EA | 75 | 1 | 2 | | 75 | 4475 | 10 |
| EA | 75 | 1 | 2 | | 75 | 4550 | 10 |
| ZE90A-120 | 0 | | | GRD | 0 | 4550 | 10 |

Table III provides the characteristics of the vis-breaking process.

TABLE III

| Production Rate | lb/h | 2000 |
|---|---|---|
| Ethylene-Propylene Copolymer Feed Rate | lb/h | 1700 |
| Polypropylene feed rate | lb/h | 300 |
| Luperox101 feed rate | lb/h | 6.5 |
| Vent Zone | Zone | 8 |
| Die Hole Dia | inch | 0.125 |
| No. of Holes Open | Nr. | 80 |
| Pelletizer Hubs Spokes | Nr. | 2 |
| Pelletizer Hub Blades | Nr. | 2 |
| Pelletizer Spring | Color | Red |
| Screen OD | inch | 5.75 |
| Screen Pack-Screen 1 | Mesh | 40 |
| Screen Pack-Screen 2 | Mesh | 325 |
| Screen Pack-Screen 3 | Mesh | 200 |
| Screen Pack-Screen 4 | Mesh | 80 |
| Screen Pack-Screen 5 | Mesh | 40 |
| Vent Zone Vacuum | in Hg | 27 |
| Screw Speed | rpm | 250 |
| Feed Zone Temp. | F. | cooled |
| Extruder Zone 2 | F. | 298 |
| Extruder Zone 3 | F. | 420 |
| Extruder Zone 4 | F. | 461 |
| Extruder Zone 4.5 | F. | 370 |
| Extruder Zone 5 | F. | 458 |
| Extruder Zone 6 | F. | 440 |
| Extruder Zone 7 | F. | 403 |
| Extruder Zone 8 | F. | 393 |
| Extruder Zone 9 | F. | 304 |
| Extruder Zone 10 | F. | 369 |
| Upstream Melt Psig | Psig | 315 |
| Upstream Melt Temp. | F. | 419 |
| Downstream Melt Psig | Psig | 193 |
| Downstream Melt Temp. | F. | 330 |
| Die Plate | F. | 340 |
| Pelletizer Speed | rpm | 1750 |
| Pelletizer amps | amps | 23 |
| Product MFR | | 230 |

Example 2

A process according to the present invention was demonstrated using a WERNER-PFLEIDERER ZSK-90 (Werner-Pfleiderer, nka, Coperion) co-rotating, intermeshing, twin-screw extruder.

A gear pump was installed at the exit of the extruder, followed by a screen changer, the die plate, and a pelletizer. A vacuum pump was connected to the vent port from Barrel 8. The polypropylene and the ethylene-propylene copolymer were fed using independent loss-in-weight feeders. The peroxide was injected in Barrel 2 using an injection nozzle. The antioxidant, IRGAPHOS 168 (Ciba Specialties), was injected as a slurry into the 6$^{th}$ barrel of the extruder. A polyalphaolefin, SPECTRASYN 100 (ExxonMobil Chemical Co.), was used as the slurry medium. The process conditions are given below in Table IV. A product with a melt flow rate of 118 was obtained.

TABLE IV

| VM6200 Feed rate | kg/h | 297.5 |
|---|---|---|
| PP3155 Feed rate | kg/h | 52.5 |
| Luperox101 feed rate | kg/h | 0.48 |
| Antioxidant Slurry Feed Rate | kg/h | 1.4 |
| Irgaphos 168 Content | wt % | 25 |
| SpectraSyn 100 Content | wt % | 75 |
| Peroxide Port Location | | 2 UP/Under |
| Antioxidant Port Location | | 6 Downstream |
| Vent Zone | Zone | 8 |
| Die Hole Dia | inch | 0.125 |
| No. of Holes Open | Nr. | 25 |
| Pelletizer Hubs Spokes | Nr. | 8 |
| Pelletizer Hub Type | | Wobble |
| Pelletizer Hub Blades | Nr. | 8 |
| Pelletizer Spring | Color | Red |
| Screw Speed | rpm | 200 |
| Extruder Power Used | KW | 63 |
| Screw Torque | % | 67 |
| Feed Zone Temp. | C. | Cooled |
| Extruder Zone 2 | C. | 115 |
| Extruder Zone 3 | C. | 203 |
| Extruder Zone 4 | C. | 220 |
| Extruder Zone 5 | C. | 222 |
| Extruder Zone 6 | C. | 222 |
| Extruder Zone 7 | C. | 222 |
| Extruder Zone 8 | C. | 168 |
| Extruder Zone 9 | C. | 140 |
| Extruder Zone 10 | C. | 104 |
| MFP Suction Pressure | Psig | 122 |
| Melt Gear Pump Temp. | C. | 194 |
| MGP Discharge Pressure | Psig | 655 |
| Screen | C. | 150 |
| Die Pressure | Psig | 525 |
| Die Plate | C. | 131 |
| Pelletizer Speed | rpm | 1491 |
| Pelletizer water Temp | C. | 26.8 |
| Vac Pump Pressure | in Hg | 23.8 |

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for forming one or more fibers, the method comprising:
   (i) charging to a reactive extruder a first polymer and a second polymer to form an initial blend, where the first polymer is a propylene-based elastomer including up to 35% by weight ethylene-derived units and a heat of fusion, as determined according to DSC procedures according to ASTM E-793, of less than 80 J/g and a melt temperature of less than 110° C., where the second polymer is a propylene-based polymer having a melt temperature in excess of 110° C. and a heat of fusion in excess of 80 J/g;
   (ii) after said step of charging, charging a peroxide to the initial blend to thereby form a reactive blend;
   (iii) conducting the reactive blend at a flow rate through a series of barrels within the extruder;
   (iv) subjecting the reactive blend, in one or more barrels, to high shear mixing;
   (v) maintaining the temperature of the reactive blend at a temperature sufficient to decompose at least 50% of the peroxide and thereby form a reacted blend;
   (vi) restricting flow rate of the reacted blend through one or more barrels to increase the time that the reactive blend is subjected to the high shear mixing;
   (vii) increasing flow rate of the reacted blend through one or more barrels;
   (viii) after said step of increasing the flow rate, passing the reacted blend through one or more screens to thereby remove unwanted contaminates;
   (ix) extruding the reacted blend through a plurality of die capillaries to form one or more molten threads or filaments; and
   (x) attenuating the molten threads or filaments in a gas stream to form one or more meltblown fibers.

2. The process of claim 1, where said step (v) includes maintaining the temperature of the reactive blend at a temperature sufficient to decompose at least 70% of the peroxide.

3. The process of claim 1, where said step (v) includes maintaining the temperature of the reactive blend at a temperature sufficient to decompose at least 90% of the peroxide.

4. The process of claim 1, where said step (v) includes maintaining the temperature of the reactive blend to at least 165° C.

5. The process of claim 1, where said step (v) includes maintaining the temperature of the reactive blend to at least 185° C.

6. The process of claim 1, where said step (iii) includes charging at least 1,000 ppm peroxide based upon the weight of the propylene-based elastomer and the propylene-based thermoplastic resin combined.

7. The process of claim 1, where said step (iii) includes charging at least 3,000 ppm peroxide based upon the weight of the propylene-based elastomer and the propylene-based thermoplastic resin combined.

8. The process of claim 1, where the reacted blend is extruded through the plurality of die capillaries at a rate greater than or equal to 0.3 grams per hole per minute.

9. The process of claim 1, wherein the process further comprises introducing an antioxidant to the reacted blend.

10. The process of claim 1, wherein the process further comprises depositing the meltblown fibers on a collecting surface to form a web or fabric.

11. A method for forming fibers, the method comprising:
(i) charging to a reactive extruder a first polymer and a second polymer to form an initial blend, where the first polymer is a propylene-based elastomer including up to 35% by weight ethylene-derived units and a heat of fusion, as determined according to DSC procedures according to ASTM E-793, of less than 80 J/g and a melt temperature of less than 110° C., where the second polymer is a propylene-based polymer having a melt temperature in excess of 110° C. and a heat of fusion in excess of 80 J/g;
(ii) after said step of charging, charging a peroxide to the initial blend to thereby form a reactive blend;
(iii) conducting the reactive blend at a flow rate through a series of barrels within the extruder;
(iv) subjecting the reactive blend, in one or more barrels, to high shear mixing;
(v) maintaining the temperature of the reactive blend at a temperature of at least 165° C. for at least 5 seconds and thereby form a reacted blend;
(vi) restricting flow rate of the reacted blend through one or more barrels to increase the time that the reactive blend is subjected to the high shear mixing;
(vii) increasing flow rate of the reacted blend through one or more barrels;
(viii) after said step of increasing the flow rate, passing the reacted blend through one or more screens to thereby remove unwanted contaminates;
(ix) extruding the reacted blend through a plurality of die capillaries to form molten threads or filaments; and
(x) attenuating the molten threads or filaments in a gas stream to form meltblown fibers.

12. The process of claim 11, where said step (v) includes maintaining the temperature of the reactive blend at a temperature of at least 185° C. for at least 15 seconds.

13. A method for forming a fiber, the method comprising:
(i) charging to a reactive extruder a first polymer and a second polymer to form a blend, where the first polymer is a propylene-based elastomer including up to 35% by weight ethylene-derived units and a heat of fusion, as determined according to DSC procedures according to ASTM E-793, of less than 80 J/g and a melt temperature of less than 110° C., where the second polymer is a propylene-based polymer having a melt temperature in excess of 110° C. and a heat of fusion in excess of 80 J/g;
(ii) after said step of charging, charging a peroxide to the blend to thereby form a reactive blend;
(iii) conducting the reactive blend at a flow rate through a series of barrels within the extruder;
(iv) subjecting the reactive blend, in one or more barrels, to high shear mixing;
(v) maintaining the temperature of the reactive blend at a temperature of at least 165° C. for at least 5 seconds and thereby form a reacted blend;
(vi) restricting flow rate of the reacted blend through one or more barrels to increase the time that the reactive blend is subjected to the high shear mixing;
(vii) increasing flow rate of the reacted blend through one or more barrels;
(viii) after said step of increasing the flow rate, passing the reacted blend through one or more screens to thereby remove unwanted contaminates;
(ix) introducing the reacted blend to a spinneret to form one or more filaments; and
(x) quenching the filaments with air to form one or more fibers.

14. The process of claim 13, where said step (v) includes maintaining the temperature of the reactive blend at a temperature of at least 185° C. for at least 15 seconds.

15. The process of claim 13, where said step (v) includes maintaining the temperature of the reactive blend at a temperature of at least 185° C. for at least 20 seconds.

16. The process of claim 13, where said step (iii) includes charging at least 1,000 ppm peroxide based upon the weight of the propylene-based elastomer and the propylene-based thermoplastic resin combined.

17. The process of claim 13, where said step (iii) includes charging at least 3,000 ppm peroxide based upon the weight of the propylene-based elastomer and the propylene-based thermoplastic resin combined.

18. The process of claim 13, wherein the process further comprises introducing an antioxidant to the reacted blend.

19. The process of claim 13, wherein the process further comprises depositing the fibers on a collecting surface to form a web or fabric.

* * * * *